United States Patent [19]

Asanuma et al.

[11] Patent Number: 5,132,157

[45] Date of Patent: Jul. 21, 1992

[54] STRETCHED FILMS OF POLYPROPLENE

[75] Inventors: Tadashi Asanuma; Kazuhiko Yamamoto; Tateyo Sasaki; Takeo Inoue; Takayuki Yamada, all of Osaka, Japan

[73] Assignee: Mitsui Toatsu Chemicals, Incorporated, Tokyo, Japan

[21] Appl. No.: 525,726

[22] Filed: May 21, 1990

[30] Foreign Application Priority Data

May 23, 1989 [JP] Japan .................................. 1-127855

[51] Int. Cl.$^5$ ........................ B32B 3/00; B32B 27/32; B29C 49/00
[52] U.S. Cl. .................................. 428/141; 428/156; 428/332; 428/339; 428/409; 428/523; 428/910; 264/211; 264/167; 264/284; 264/293; 264/288.4; 264/288.8; 156/196; 156/209
[58] Field of Search .............. 428/156, 119, 409, 300, 428/521, 523, 141, 212, 213, 332, 339, 910; 264/284, 293, 145, 167, 177.1, 177.69, 210.1, 210.5, 211, 211.2, 214, 288.4, 288.8; 156/196, 209, 229, 224.25

[56] References Cited

U.S. PATENT DOCUMENTS

| | | | |
|---|---|---|---|
| 4,478,663 | 10/1984 | O'Sullivan | 428/156 |
| 4,775,571 | 10/1988 | Mizuno et al. | 428/156 |
| 4,975,329 | 12/1990 | Bothe et al. | 428/910 |

Primary Examiner—Robinson, Ellis P.
Assistant Examiner—Donald J. Loney
Attorney, Agent, or Firm—Burns, Doane, Swecker & Mathis

[57] ABSTRACT

A stretched film of polypropylene which is excellent in transparency, substantially free of an antiblocking agent and at least uniaxially stretched and which is characterized in that it has uniformly distributed projections having a height ranging from 0.05 to 0.50 $\mu$ and a width ranging from 10 to 100 $\mu$ at least on the surface thereof as well as a method for preparing the foregoing stretched film of polypropylene which comprises the steps of forming, into a sheet, polypropylene which comprises a nucleating agent in an amount selected so that the crystallization temperature of polypropylene is increased by 1° to 10° C. by the addition thereof and then stretching the sheet at a temperature ranging from 140° to 165° C. are herein disclosed.

3 Claims, No Drawings

STRETCHED FILMS OF POLYPROPLENE

BACKGROUND OF THE INVENTION

1. Field of the Invention

The present invention relates to a stretched film of polypropylene which is excellent in transparency and which does not suffer from problems that upon winding films on a roll over and over, such as the films are adhered to one another which makes it difficult to unroll the film and uneven dimensional change due to sliding of the rolled film with time.

2. Description of the Prior Art

Polypropylene is not expensive and has relatively high rigidity. In addition, it has good transparency even when it is formed into a stretched film. For this reason, polypropylene has widely been used in the form of stretched films in various uses. When polypropylene is in general used in the form of stretched films, the stretched film is wound on a roll, stored in the rolled state and unrolled when it is put in practical use. However, unrolling of the stretched film is accompanied by various problems such as difficulty of unrolling and twisting of the film. To solve such problems, an antiblocking agent (hereunder referred to as "AB agent") is commonly added to the polypropylene films. Examples of such AB agents are fine particles of inorganic compounds such as silica, cross-linked polysiloxanes and melamineformaldehyde condensates.

The foregoing method in which an AB agent is incorporated into the polypropylene films is effective for preventing blocking, but suffers from various problems. For instance, the transparency of the resulting stretched film becomes insufficient since voids are formed at the portions in which particles of the AB agents used are present when such a polypropylene film is stretched. It is difficult to uniformly disperse the AB agents, blocking is thus caused at the portions where the particles of the AB agents are absent, this in turn leads to non-uniform change in the rolled state with time. Thus, dimensional change of the film also becomes non-uniform and consequently discrepancy in printing during post processing can occur.

SUMMARY OF THE INVENTION

Accordingly, an object of the present invention is to provide a stretched film of polypropylene which is excellent in transparency.

Another object of the present invention is to provide a stretched film of polypropylene which is substantially free of such AB agents.

A further object of the present invention is to provide a stretched film of polypropylene which does not suffer from a problem of blocking; and is free from non-uniform dimensional change which is caused due to sliding of the rolled film with time.

According to the present invention, the foregoing objects can effectively be achieved by providing a stretched film substantially free of an antiblocking agent and at least uniaxially stretched. The stretched film of polypropylene of the present invention is characterized in that it has uniform projections having a height ranging from 0.05 to 0.50$\mu$ and a width ranging from 10 to 100$\mu$ at least on its surface.

DETAILED EXPLANATION OF THE INVENTION

The stretched film of polypropylene according to the present invention will hereunder be described in more detail.

In the present invention, the term "AB agent" means, for instance, fine powder of inorganic compounds such as silica and zeolite, cross-linked polysiloxane and melamineformaldehyde condensates which are commonly employed as discussed above. Further, the term "substantially free of AB agent" means that the AB agent is not used in an amount such that if the foregoing AB agents are used separately, they show their effects clearly.

The size of the projections in the present invention is determined by examining surface conditions of the projections which are three-dimensionally expressed by scanning lines corresponding to the surface roughness obtained with a contact finger type three dimensional surface roughness profilometer. In the present invention, it is of great importance that the film be provided with, on its surface, uniform projections having a height ranging from 0.05 to 0.50$\mu$, preferably from 0.05 to 0.40$\mu$ and a width ranging from 10 to 100$\mu$, preferably from 20 to 90$\mu$. This is because if the height thereof exceeds 0.50$\mu$, the transparency of the resulting film is impaired, in other words, the film becomes opaque, while if it is less than 0.05$\mu$, the blocking-inhibiting effect is not expected at all. On the other hand, if the width thereof exceeds 100$\mu$, almost no blocking-inhibiting effect is expected and if it is less than 10$\mu$, the gloss of the film becomes insufficient. In general, the height of the projections is controlled by adjusting the amount of a nucleating agent and stretching conditions so that the height thereof falls within the range of from 0.05 to 0.5$\mu$ as will be detailed below and correspondingly the width thereof also falls within the foregoing range. The number of the projections on the surface of the film is preferably not smaller than 25 per unit area (1 mm$^2$). If it is less than 25 per 1 mm$^2$, the intended blocking-inhibiting effect cannot be expected. However, if it is too large in the order of not smaller than 2,000, satisfactory blocking improving effect cannot likewise be expected and the transparency of the film becomes also insufficient.

The stretched film of polypropylene according to the present invention can be prepared, for instance, by forming polypropylene containing a nucleating agent into a sheet-like material and then stretching the sheet at a relatively high temperature. As such nucleating agents, those consisting of polymeric compounds are preferably employed in the present invention, whereby releasing of the nucleating agent from the resulting molded products of polypropylene can effectively be prevented if a polymeric compound is used as a nucleating agent. Although quinacridine type compounds are low molecular weight compounds, they can be employed in the present invention as nucleating agents. This is because they show nucleating effect even in a very small amount. In the present invention, the nucleating agents are not restricted to specific ones as long as they can increase the crystallization temperature (as determined by differential scanning calorimetry) of polypropylene when they are incorporated into the latter. In general, polymeric compounds which can increase the crystallization temperature of polypropylene are suitably employed in the present invention.

Examples of such polymeric compounds include polyolefins having a high melting point, preferably polymers of branched olefins and polymers of alkenylsilanes. Specific examples of preferred polymeric compounds are polymers of olefins having 5 to 12 carbon atoms and branched at the 3- or 4-position thereof or polymers of monomers represented by the following general formula:

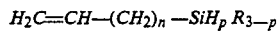

(wherein n is an integer ranging from 0 to 12, p is an integer ranging from 0 to 3 and R represents a hydrocarbon group having 1 to 12 carbon atoms). In general, these polymers are prepared by polymerizing the corresponding monomers in the presence of a known Ziegler Natta catalyst comprising a transition metal compound and an organometal compound in a known manner. Alternatively, it is also possible to add these polymeric compounds in polypropylene by treating a catalyst with these branched olefins or alkenylsilanes in advance when propylene is polymerized to obtain polypropylene (see, for instance, Japanese Unexamined Patent publication (hereunder referred to as "J. P. KOKAI") No. Sho 63-69802). The preferred amount of the polymeric compounds as the nucleating agents to be added to polypropylene varies depending on the kinds of the polymeric compounds selected, but in general it is selected so that the increase in the crystallization temperature of polypropylene ranges from 1° to 10° C. and preferably 1° to 5° C. Further, the aforesaid known AB agents may simultaneously be used in an amount at which they do not show their effects at all if the foregoing AB agents are used separately. The transparency of the stretched film is not impaired and the AB agents are not released from the resulting polymer during molding to thus cause troubles, as long as they are used at that level.

The stretched film of the present invention can be prepared by stretching a sheet containing the foregoing polymeric compounds as the nucleating agents at a relatively low temperature preferably not lower than 140° C. and not higher than 165° C. If the stretching temperature is less than 140° C., the formation of the foregoing projections are not ensured and hence any blocking-inhibiting effect cannot almost be expected. The reason why the blocking-inhibiting effect is achieved by controlling the stretching temperature to such a range have not yet been clearly elucidated. One possible way of explanation is to consider that different crystalline forms are obtained through the use of the foregoing polymeric compounds as the nucleating agents and that the resulting crystalline forms are changed by stretching the film at a relatively high temperature whereby the projections are formed (see, for instance, J. P. KOKAI No. Sho 52-129264). The presence of β-crystals in the sheet prior to stretching is not confirmed by differential scanning calorimetry and X-ray diffraction analysis even when the sheet is maintained under the conditions which provide the stretched sheet according to the present invention. Moreover, it is of primary importance that the size of the projections falls within the range defined above. An acceptable balance between the transparency and the blocking-inhibiting effect can be achieved only when the requirements for the size of the projection is satisfied.

The present invention will hereinafter be explained in more detail with reference to the following non-limitative Examples and the effects practically achieved by the present invention will also be discussed in detail in comparison with the following Comparative Examples.

EXAMPLE 1

An oscillating mill equipped with two 0.97 l inner volume pots for pulverization to which 2.2 kg of steel balls having a diameter of 12 mm had been added was prepared and 20 g each of magnesium chloride, 4 ml each of tetraethoxysilane and 3 ml each of α, α, α-trichlorotoluene were added to these two pots and then were pulverized for 40 hours. 10 g of the resulting ground product was introduced into a 200 ml flask, 50 ml of titanium tetrachloride and 50 ml of toluene were added to the flask and the mixture was stirred at 100° C. for 30 minutes. Thereafter, the supernatant was removed, and 50 ml of titanium tetrachloride and 50 ml of toluene were added to the flask. The mixture was stirred at 100° C. for 30 minutes and the solid content obtained by removing the supernatant was repeatedly washed with n-hexane to thus obtain a slurry of a transition metal catalyst. A part thereof was sampled and the content of titanium was analyzed and found to be 1.8% by weight.

To a 200 ml flask, there were added 5 g of the transition metal catalyst obtained above, 5 ml of diethyl aluminum chloride, 10 ml of allyltrimethylsilane and 10 ml of toluene, the mixture was stirred at 60° C. for 2 hours, then the resulting slurry was introduced into a 3 l inner volume autoclave, 1 l of heptane, 0.6 ml of methyl p-toluylate and 5 ml of trimethylaluminum were added to the slurry, 0.2N l of hydrogen gas and propylene were introduced till the internal pressure of the autoclave reached 5 kg/cm$^2$ gauge and then polymerization was performed at an internal temperature of 60° C. while introducing propylene in a flow rate controlled so that the internal pressure was maintained at a constant level till the total amount of propylene absorbed reached 500 g. Then unreacted propylene was purged, 200 ml of methanol was added to the reaction mixture, the mixture was stirred at 90° C. and the resulting slurry was purified by washing it with water. The slurry was filtered to remove powdery sunbstances and the powder was dried at 80° C. and 60 mm Hg for 12 hours to thus obtain master powder containing 12,000 ppm of allyltrimethylsilane polymers. The resulting powder was analyzed and the intrinsic viscosity (hereinafter referred to as "η" for simplicity) determined on a tetralin solution thereof at 135° C. was 1.58. Then, there were mixed, in an extruder, a homopolymer of propylene having η of 2.20 and the amount of residues remaining after extraction (hereinafter referred to as "II") of 97.5% by weight as determined by extracting it with boiling n-heptane for 6 hours with a Soxhlet extractor, the foregoing master powder and BHT as an antioxidant (in an amount of 0.2% by weight on the basis of the weight of the polymer) to thus obtain a composition containing 0.2 ppm of allyltrimethylsilane. The resulting composition was extruded into a sheet having a thickness of 750μ with an extruder of 40 mmφ at a temperature of 250° C. Thereafter, the sheet thus obtained was stretched 5 times in the MD direction and 7 times in the TD direction at 155° C. with a biaxial stretching machine available from T M LONG Co. to obtain a stretched film. The physical properties of the stretched film are summarized in the following Table 1. In Table 1, the degree of haze is expressed as the overall haze and also as internal haze. The internal haze corelates with voids formed during the stretching operations and the greater the difference between the internal haze and the overall haze, the higher the effective relative roughness.

Overall Haze: This is determined according to ASTM D1003.

Internal Haze: This is determined after applying liquid paraffin having a relatively low viscosity on the both sides of the film to eliminate the influence of scattering due to unevenness of the surface of the film.

Crystallization Temperature: The substance to be examined is heated at 230° C. for 10 minutes in a differential scanning calorimeter and then the temperature is dropped at a velocity of 10° C./min to determine the peak temperature of the heat generation. The peak temperature thus obtained is defined as the crystallization temperature of the substance.

Blocking: Two sheets of films are superimposed to one another at a temperature of 50° C. for 24 hours under a load of 50 g/cm$^2$ and the total area of the film adhered is expressed in the area percentage. Surface Projections: The film surface (300μ(in the TD direction)×2,000μ (in the MD direction)) is examined by a three dimensional surface roughness profilometer available from KOSAKA LABORATORY and the size and the number of the projections are expressed in their average values. Comparative Example 1

A biaxially stretched film was prepared in the same manner used in Example 1 except that the polypropylene obtained in Example 1 was used and polytrimethylallylsilane was not used at all. The physical properties of the resulting film are listed in Table 1.

COMPARATIVE EXAMPLE 2

The same procedures used in Example 1 were repeated except that 0.2% by weight of SYLOID 224 (available from FUJI DEVISON CHEMICAL LTD.) was used as an AB agent and the master powder of allyltrimethylsilane was not used to form a film. The physical properties of the resulting film are listed in Table 1. The resulting film was excellent in blocking-inhibiting effect, but voids were formed within the film and haze thereof was correspondingly insufficient.

EXAMPLE 2

The same procedures used in Example 1 were repeated except that a homopolymer having an η of 2.30 and a JI of 98.2% was employed as a polypropylene and that in place of trimethylallylsilane, 4-methylpentene-1 was used to obtain master powder containing 9,000 ppm of poly(4-methylpentene-1) and the master powder was mixed so that the content thereof was 1 ppm to obtain a stretched film. The results obtained are listed in Table 1.

Both the blocking-inhibiting effect and haze of the resulting film were good.

COMPARATIVE EXAMPLE 3

The same procedures used in Example 2 were repeated except that the stretching temperature was changed to 135° C. to form a stretched film. The results obtained are likewise summarized in Table 1.

COMPARATIVE EXAMPLE 4

The same procedures used in Example 2 were repeated except that the content of the poly(4-methylpentene-1) was controlled to 10 ppm to form a stretched film. The results obtained are likewise summarized in Table 1. The size of the projections present on the surface of the film was too great and hence the film was opaque.

EXAMPLE 3

The same procedures used in Example 1 were repeated except that the amount of the poly(trimethylallylsilane) was changed to 0.1 ppm(wt) and that 0.05% by weight of SYLOID 224 was added to obtain a stretched film. In this Example, two types of projections were formed. The results obtained are summarized in Table 1. The haze of the resulting film was slightly lowered due to the formation of voids therein. However, according to this embodiment, the amount of SYLOID 224 can be reduced and the physical properties thereof are quite good in comparison with those for the film containing only SYLOID 224 (Comparative Example 2).

EXAMPLE 4

The same procedures used in Example 1 were repeated except that the amount of the poly(trimethylallylsilane) was changed to 0.8 ppm(wt) and that the stretching temperature was changed to 157° C. to obtain a stretched film. The results obtained are summarized in Table 1.

TABLE 1

| Example number or Comp. Example No. | Cry. temperature (°C.) | Blocking | Haze Overall | Haze Internal | Surface Projection Height (μ) | Surface Projection Width (μ) | Number |
|---|---|---|---|---|---|---|---|
| Example 1 | 114.2 | 8 | 1.9 | 0.1 | 0.05 | 50 | 400 |
| Comp. Example 1 | 110.5 | 95 | 0.9 | 0.1 | 0.05 | 120 | 100 |
| Comp. Example 2 | 110.6 | 11 | 3.3 | 1.2 | 0.2 | 5 | 144 |
| Example 2 | 113.3 | 5 | 1.8 | 0.1 | 0.30 | 75 | 90 |
| Comp. Example 3 | 113.1 | 90 | 0.7 | 0.1 | 0.02 | 40 | 324 |
| Comp. Example 4 | 114.0 | 30 | 8.4 | 0.1 | 1.2 | 100 | 25 |
| Example 3 | 114.6 | 3 | 2.3 | 0.4 | 0.2 | 5 | 25 |
|  |  |  |  |  | 0.06 | 50 | 144 |
| Example 4 | 111.5 | 10 | 2.0 | 0.1 | 0.09 | 30 | 480 |

As has been described above in detail, the stretched film according to the present invention is excellent in transparency as well as blocking-inhibiting effect and thus the film has enough industrial value.

We claim:

1. A stretched film of polypropylene excellent in transparency, which is substantially free of an antiblocking agent and at least uniaxially stretched, the stretched film being characterized in that is has uniformly distributed projections that are present in the range of from 25 to 2,000 per mm$^2$, said projections having a height ranging from 0.05 to 0.50μ and a width ranging from 10 to 100μ at least on the surface of the stretched film.

2. A method for preparing a stretched film as claimed in claim 1 comprising the steps of forming, into a sheet, polypropylene which comprises a nucleating agent in an amount selected so that the crystallization temperature of polypropylene is increased by 1° to 10° C. by the addition thereof and then stretching the sheet at a temperature ranging from 140° to 165° C.

3. The method of claim 2 wherein the nucleating agent is a polymeric compound.

* * * * *

UNITED STATES PATENT AND TRADEMARK OFFICE
CERTIFICATE OF CORRECTION

PATENT NO. : 5,132,157

DATED : July 21, 1992

INVENTOR(S) : Asanuma et al.

It is certified that error appears in the above-identified patent and that said Letters Patent is hereby corrected as shown below:

On the title page, item [54] and in column 1, line 1:
Please amend the title from "STRETCHED FILMS OF POLYPROPLENE" to --STRETCHED FILMS OF POLYPROPYLENE--.

Signed and Sealed this

Twenty-eighth Day of September, 1993

Attest:

BRUCE LEHMAN

*Attesting Officer*           *Commissioner of Patents and Trademarks*